US007007359B2

(12) United States Patent
Wilson

(10) Patent No.: US 7,007,359 B2
(45) Date of Patent: Mar. 7, 2006

(54) TIGHT-SPOT PULLEY REMOVER

(76) Inventor: Lyndon E. Wilson, P.O. Box 175, Noxon, MT (US) 59853

( * ) Notice: Subject to any disclaimer, the term of this patent is extended or adjusted under 35 U.S.C. 154(b) by 402 days.

(21) Appl. No.: 10/449,510

(22) Filed: Jun. 2, 2003

(65) Prior Publication Data

US 2004/0237272 A1 Dec. 2, 2004

(51) Int. Cl.
*B23P 19/04* (2006.01)

(52) U.S. Cl. .......................................... 29/244; 29/255
(58) Field of Classification Search .................. 29/244, 29/255, 270, 278, 256
See application file for complete search history.

(56) References Cited

U.S. PATENT DOCUMENTS 5,966,792 A * 10/1999 James ......................... 29/244
6,266,859 B1 7/2001 Hernandez
6,775,890 B1 * 8/2004 Kolarik ....................... 29/235
6,886,228 B1 * 5/2005 Chen ........................... 29/263

* cited by examiner

*Primary Examiner*—Lee D. Wilson
(74) *Attorney, Agent, or Firm*—Richard C. Litman

(57) ABSTRACT

A tight-spot power steering pump pulley removal tool for removing a power steering pump pulley, comprising a two-part interlocking structure, a handle and a forcing member. The two-part interlocking structure has a recess in at least one side, the recess defining a through bore with a thread. The through bore travels through the two-part interlocking structure; the forcing member is adapted to be screwed through the through bore. The recess further defines an axial lip overhang adapted to attach to an annular groove. The recess is adapted to accommodate a hub flange associated with a power steering pulley apparatus. The two-part interlocking structure further comprises a threaded blind hole. The handle is reversibly attached to the blind hole.

20 Claims, 12 Drawing Sheets

TIGHT-SPOT PULLEY REMOVER

BACKGROUND OF THE INVENTION

1. Field of the Invention

The present invention relates to tools. More specifically, the invention relates to a tight-spot pulley remover for removing pulleys from power steering pumps.

2. Description of the Related Art

One of the most common forms of power steering in vehicles, such as family cars and trucks, is based on hydraulic power. A power steering pump provides the hydraulic power for the power steering system. The power steering pump comprises a pulley (i.e. a grooved wheel powered by a belt driven by the vehicle's engine) mounted on a drive shaft that runs at least part way through the power steering pump. More specifically, the pulley is mounted on a pulley hub surrounding the pump's drive shaft. A hub flange extends axially from the hub to define a gap between the hub flange and the pulley called an annular groove.

A more complete description of the annular groove and mounting of the pulley on the pump drive shaft is found in U.S. Pat. No. 6,266,859, issued Jul. 31, 2001 to H. R. Hernandez. The '859 patent H. R. Hernandez is incorporated herein by reference in its entirety. A general description of hydraulic driven power steering systems is found on the world-wide-web at, for example, URL: http://auto.howstuffworks.com/steering4.htm. A tight-spot pulley removal tool that exploits the annular groove is disclosed herein.

Power steering pumps sometimes require maintenance necessitating the removal of the power steering pulley. Unfortunately the power steering pump is often located in a tight spot (i.e., a restricted space) under a vehicle's hood (i.e., engine cover). Thus, there is a need for a power steering pulley-removing tool that can be used in a tight space.

It is hard for a mechanic or human operator to maneuver tools accurately in a tight spot. Complex or multi-part tools are particularly difficult to handle and adjust in a tight spot. Thus, there is a need for a simple tight-spot pulley remover that can be used in a tight spot.

In addition, different vehicle makes and models also have different makes and models of power steering pumps. For example, the Chrysler and Ford motor manufacturers have slightly different power steering pump pulley setups, and more specifically pulley hubs with slightly different external shapes. Thus, there is a need for a tight-spot pulley remover that can easily accommodate the subtle differences between, e.g., a Chrysler pulley hub and a Ford pulley hub.

Some prior art pulley removers use a forcing screw to apply a push force against the shaft on which the pulley is mounted thereby forcing the pulley off the pulley. However, there is a natural tendency for pulley removers to rotate while in use removing a pump pulley. Thus, there is a need for a tight-spot pulley remover that counters this tendency.

Other prior art pulley remover tools are inflexible because they do not offer more than one pulley-docking member on the same pulley remover tool. For example, a power steering pulley remover (part #: CJ117C, hereinafter "the CJ11C device") is supplied by Snap-on Technologies Inc., Kenosha, Wis. (NYSE: SNA); details of the CJ11C device can be found at URL: http://buy.snapon.com/catalog/search.asp?partno=CJ117C. Each CJ117C device has one docking port for docking to a pulley. Thus, if a vehicle mechanic finds that a particular CJ117C device is unable to dock to a particular pulley setup the mechanic must try another CJ11C device or tool. Thus, there is a need for a power steering pump pulley removing tool with more than one docking member fitted to the tool; for example, there is a need for a pulley removing tool with a first and second docking members to respectively remove a Ford and Chrysler steering pump pulleys.

Mytoolstore.com (www.mytoolstore.com) provide a pulley remover and installer set (part #: KD 2897, see URL: http://www.mytoolstore.com/kd/kdbatt07.html) that is overly complex and difficult to use in a tight spot. Likewise for the ASTRO 7874 pulley remover and installer set (part #: ASTRO 7874, see URL: http://www.mytoolstore.com/astro/asthan17.html). Thus, there remains a need for a pulley remover that offers more than one docking member per pulley remover tool.

U.S. Pat. No. 6,266,859, issued Jul. 31, 2001 to H. R. Hernandez, describes a power steering pump pulley removal tool that grips the annular groove of a pulley setup. The '859 power steering pump pulley removal tool makes use of a handle (listed as a handle member #18) to counter the rotating force applied to the functional equivalent of a forcing screw (listed as a drive bolt member #20). However, the '859 power steering pump pulley removal tool is overly complex in design and use compared to the present claimed invention. In addition, the '859 device is overly large thus making it hard for a human operator to use the '859 device to remove a power steering pump pulley located in a tight spot.

None of the above inventions and patents, taken either singly or in combination, is seen to describe the instant invention as claimed. Thus a tight-spot pulley remover solving the aforementioned problems is desired.

SUMMARY OF THE INVENTION

A tight-spot power steering pump pulley removal tool for removing a power steering pump pulley, comprising a two-part interlocking structure, a handle and a forcing member. The two-part interlocking structure has a recess in at least one side, the recess defining a through bore with a thread. The through bore travels through the two-part interlocking structure; the forcing member is adapted to be screwed through the through bore. The recess further defines an axial lip overhang adapted to attach to an annular groove of a power steering pump pulley setup. The recess is adapted to accommodate a hub flange associated with a pump pulley setup. The two-part interlocking structure further comprises a threaded blind hole. The handle is reversibly attached to the blind hole to maintain the structural integrity of the two-part interlocking structure and to counter the natural tendency of the tight-spot power steering pump pulley removal tool to rotate while in use removing a pump pulley.

Accordingly, it is a principal object of the invention to provide a power steering pump pulley removal tool.

It is another object of the invention to provide a pulley removal tool that can exploit an annular groove to remove the power steering pump pulley.

It is a further object of the invention to provide a power steering pulley-removing tool that can be used in a tight space.

Still another object of the invention is to provide a simple tight-spot pulley remover that is not overly complex and comprises just a few parts that require little or no adjustment to remove a pulley from a power steering pump.

Another object of the invention is to provide a tight-spot pulley remover that can accommodate the subtle differences between, e.g., a Chrysler pulley hub and a Ford pulley hub.

Another object of the invention is to provide a tight-spot pulley remover that counters the tendency of pulley removers to rotate while in use.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
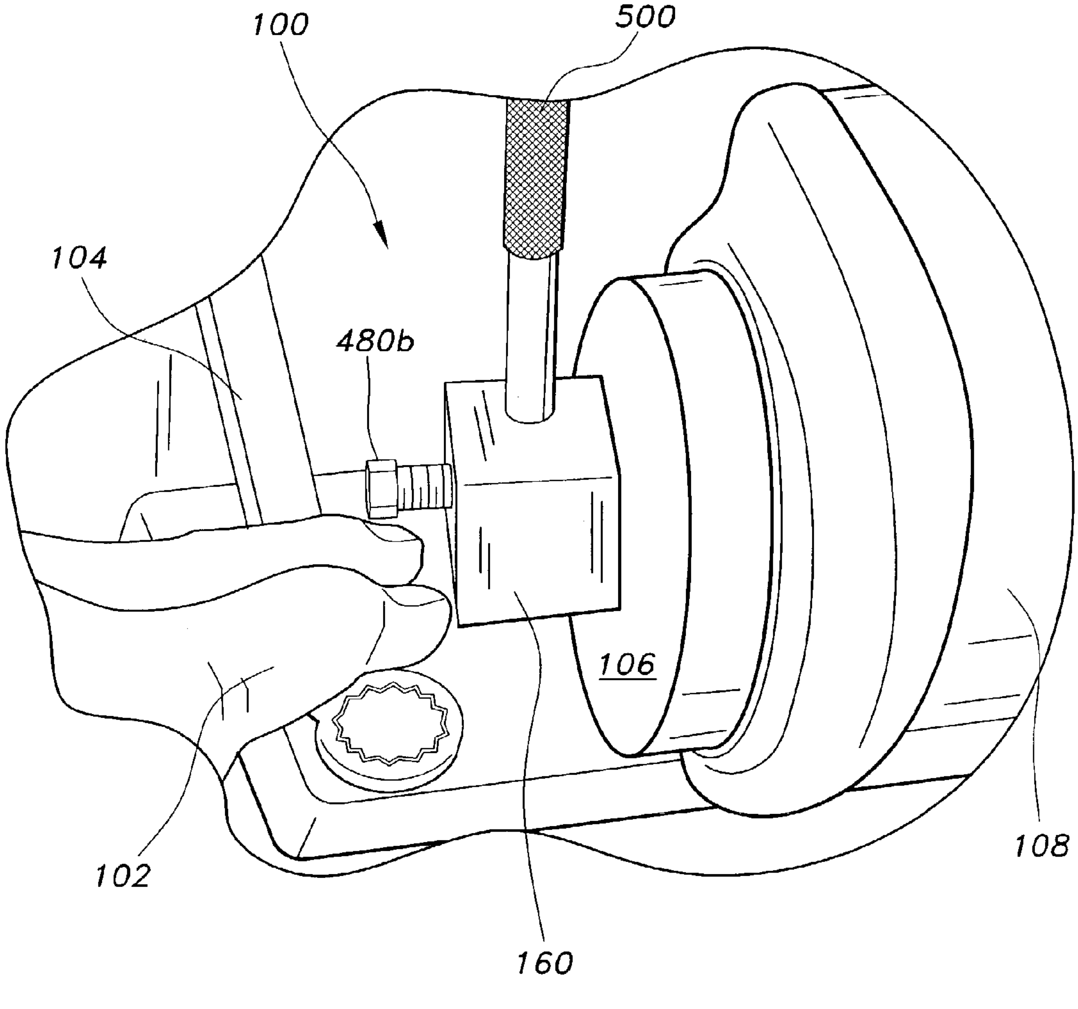
FIG. 1A is an environmental, perspective view of a tight-spot power steering pump pulley remover according to the present invention.

The present invention relates to tools. More specifically, the invention relates to a tight-spot pulley remover for removing pulleys from power steering pumps.

The tight-spot power steering pump pulley remover of the present invention is denoted generally by the reference numeral 100. For convenience, the term "tight-spot pulley remover 100" will hereinafter be used in place of the term "tight-spot power steering pump pulley remover 100".

Broadly, the tight-spot pulley remover 100 comprises a two-part interlocking structure 160, a forcing member 480 and a handle 500. The two-part interlocking structure 160 comprises a first part 120*a* and a second part 120*b*. The two-part interlocking structure 160 comprises at least one two-part recess defining a through bore to accommodate the forcing member 480. It should be understood that the terms "two-part interlocking structure" and "two-part structure" are regarded herein as equivalent terms.

Figure 1B:
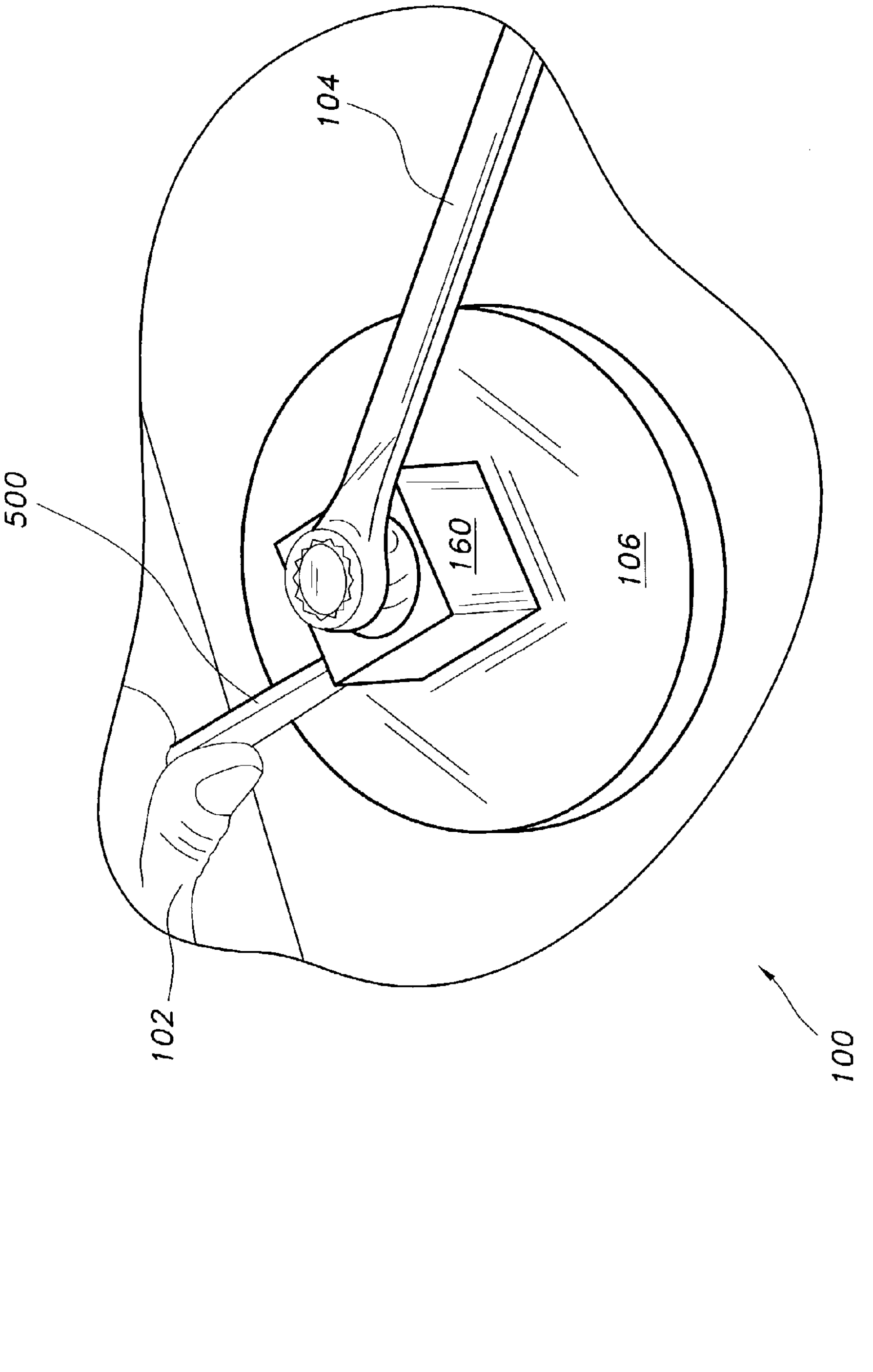
FIG. 1B is a close up view of the tight-spot power steering pump pulley remover of FIG. 1.

FIGS. 1A and 1B show an operator (represented by fingers 102) attaching a wrench 104 to the tight-spot pulley remover 100 in preparation of removing a pulley 106 from a power-steering pump 108. The tight-spot pulley remover 100 comprises a two-part interlocking structure 160 made up of two parts 120*a* and 120*b* (see, e.g., FIG. 1C).

To facilitate better understanding of the invention a brief description of the power steering pump 108 and its associated pulley 106 is provided herein. The pulley 106 is mounted on a pulley hub 112 (see FIG. 1D); the pulley hub 112 is rapped around the end 110 of the power steering pump drive shaft 109. The pulley hub 112 defines a hub-flange 114 extending axially therefrom (see, e.g., FIGS. 1D and 1E). The hub-flange 114 defines a gap called an annular groove 118 between the hub-flange 114 and the central part of the pulley 106.

Figure 1C:
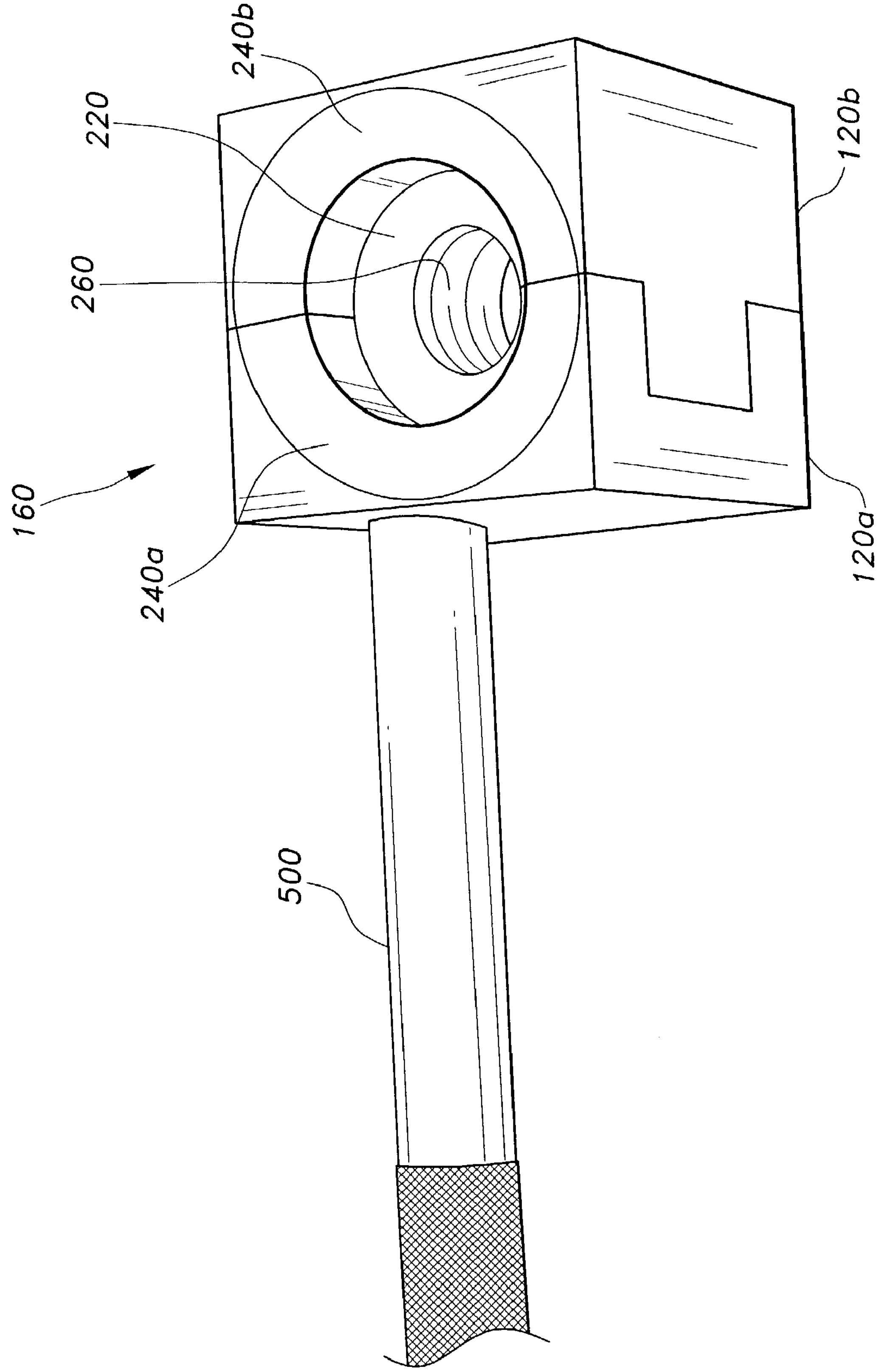
FIG. 1C is a perspective view of a tight-spot power steering pump pulley remover according to the present invention.
Figure 1D:
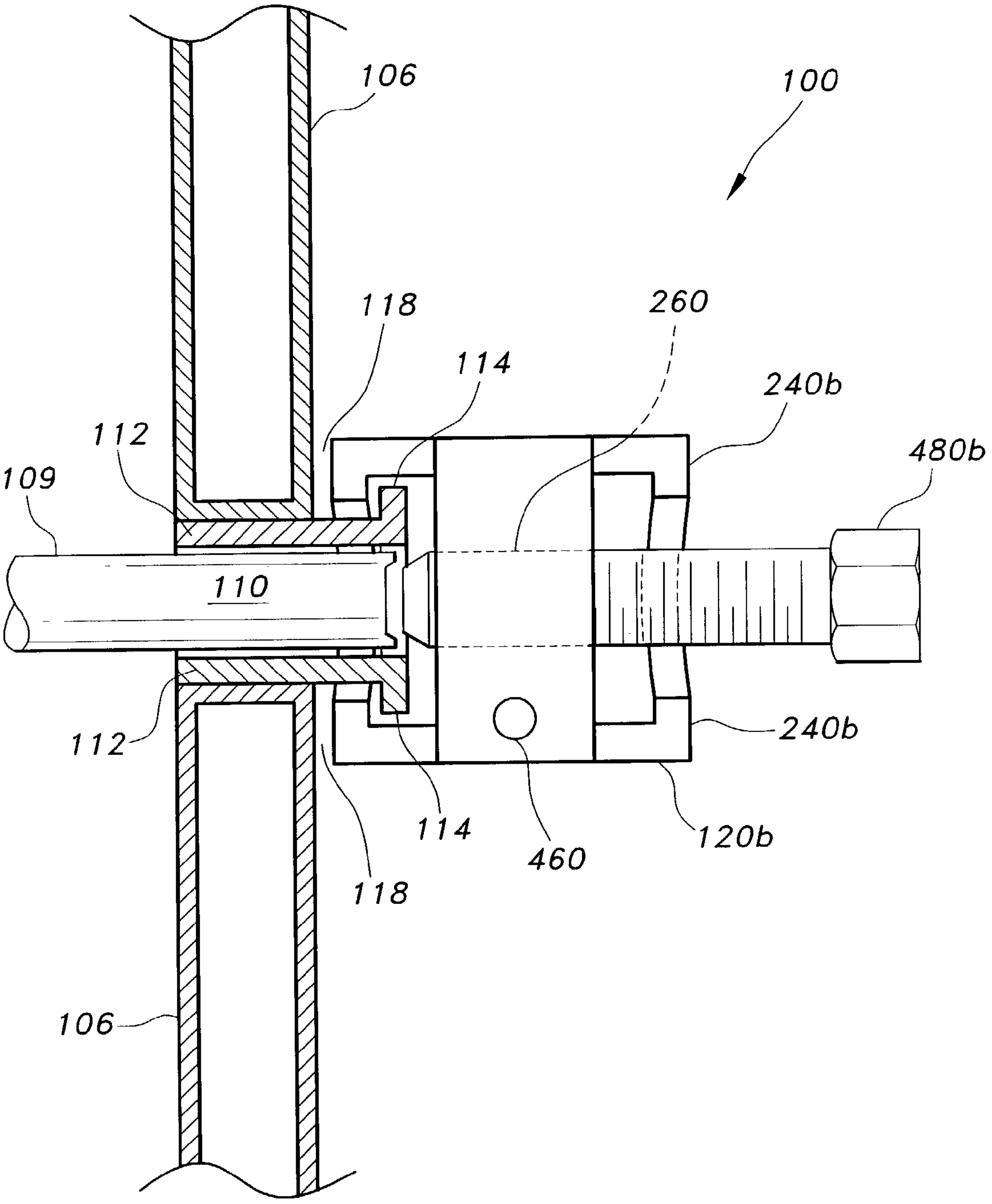
FIG. 1D is a side view of one part of a two-part interlocking structure fitted to the annular groove of a pulley apparatus, shown in section, according to the invention.
Figure 1E:
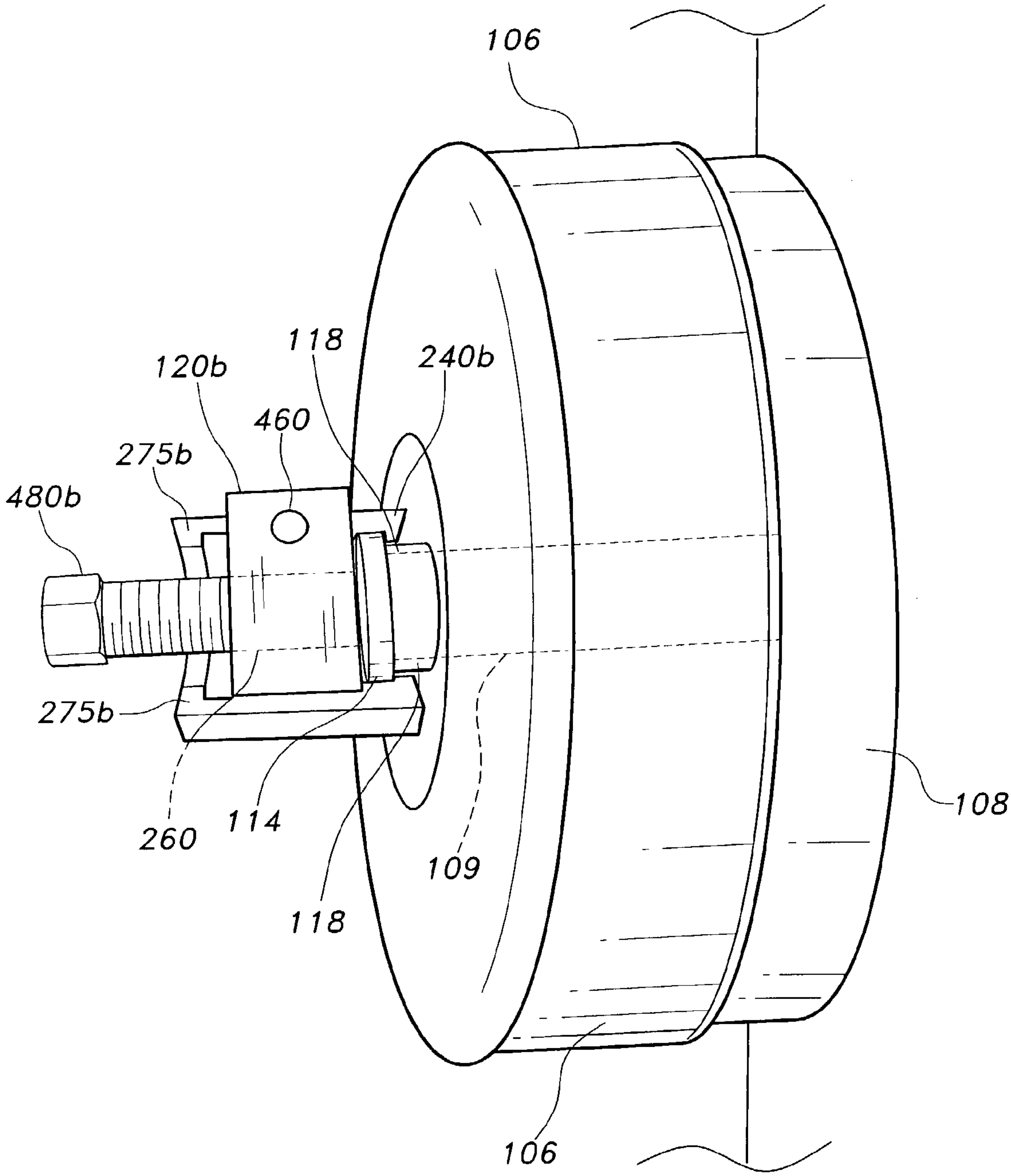
FIG. 1E is a side perspective view of one part of a two-part interlocking structure shown fitted to the annular groove of a pulley apparatus according to the invention.

To remove the pulley 106 from the pump 108 an operator 102 fits either part 120*a* or 120*b* around the annular groove 118 (see, e.g., FIGS. 1D and 1E). Then the operator 102 fits the remaining part (120*a* or 120*b*) to the annular groove 118 thus completing the attachment of the two-part interlocking structure 160 to the annular groove 118. A handle 500 is then screwed into the two-part interlocking structure 160 thus locking parts 120*a* and 120*b* together (see FIGS. 2A and 3A).

Figure 2A:
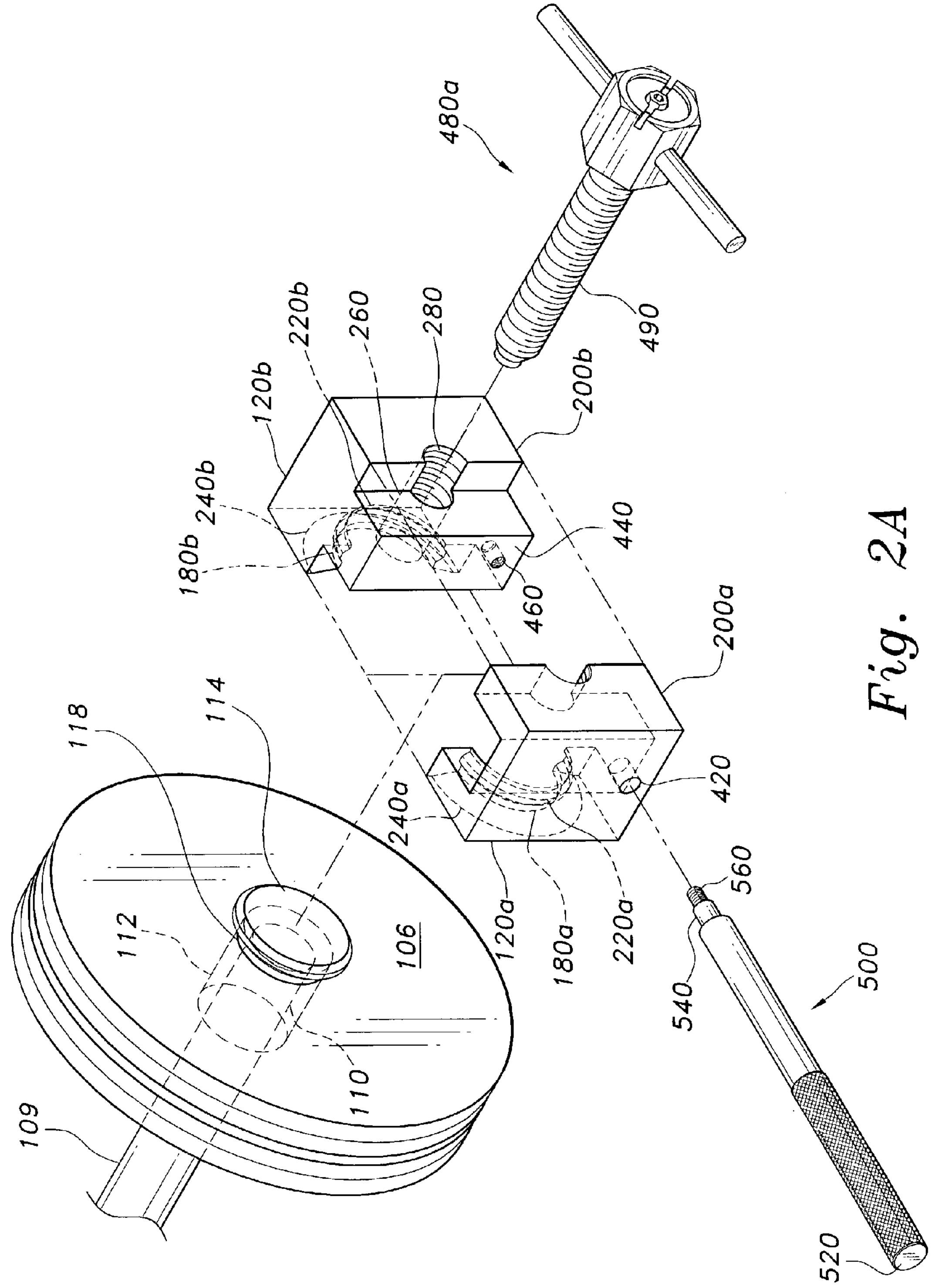
FIG. 2A is an exploded view of a tight-spot power steering pump pulley remover according to a first embodiment of the present invention.
Figure 2B:
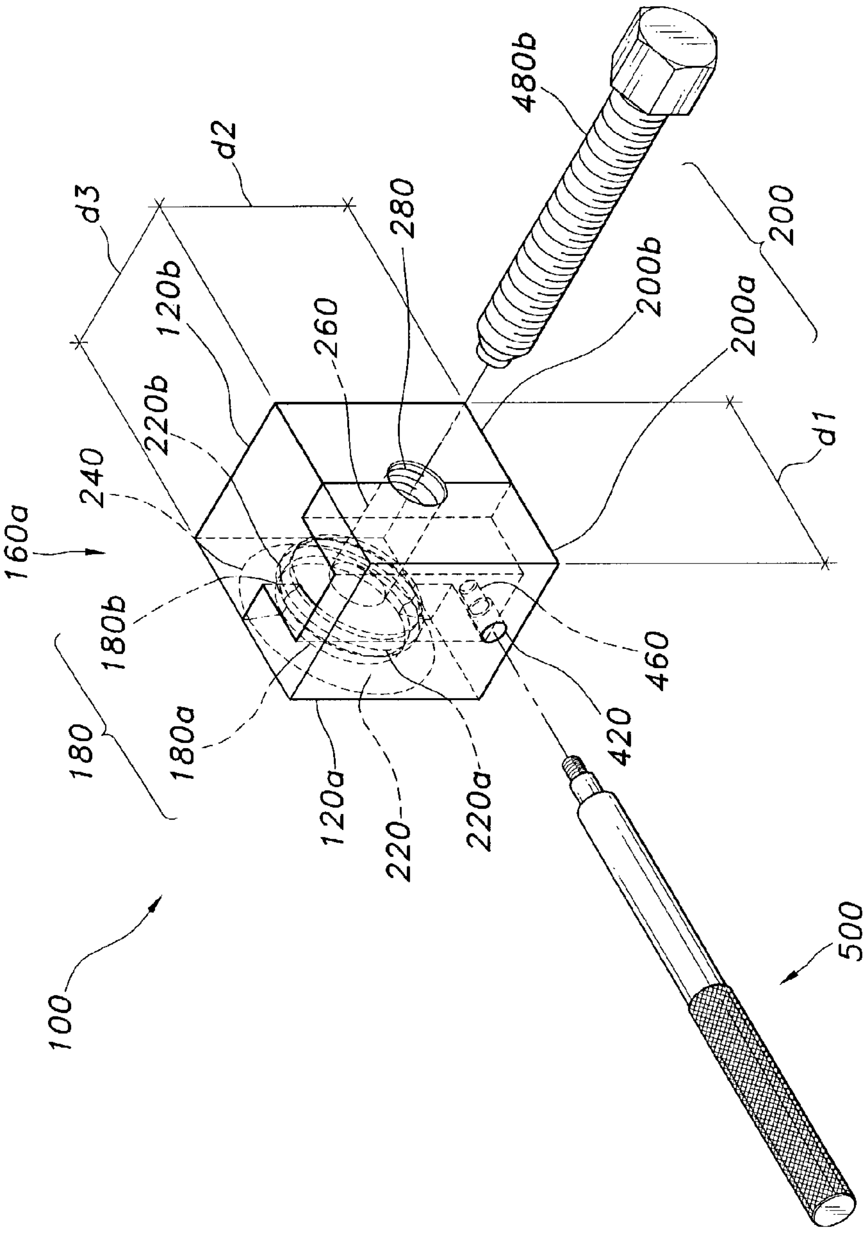
FIG. 2B is a perspective view of a two-part interlocking structure according to the first embodiment of the present invention.
Figure 2C:
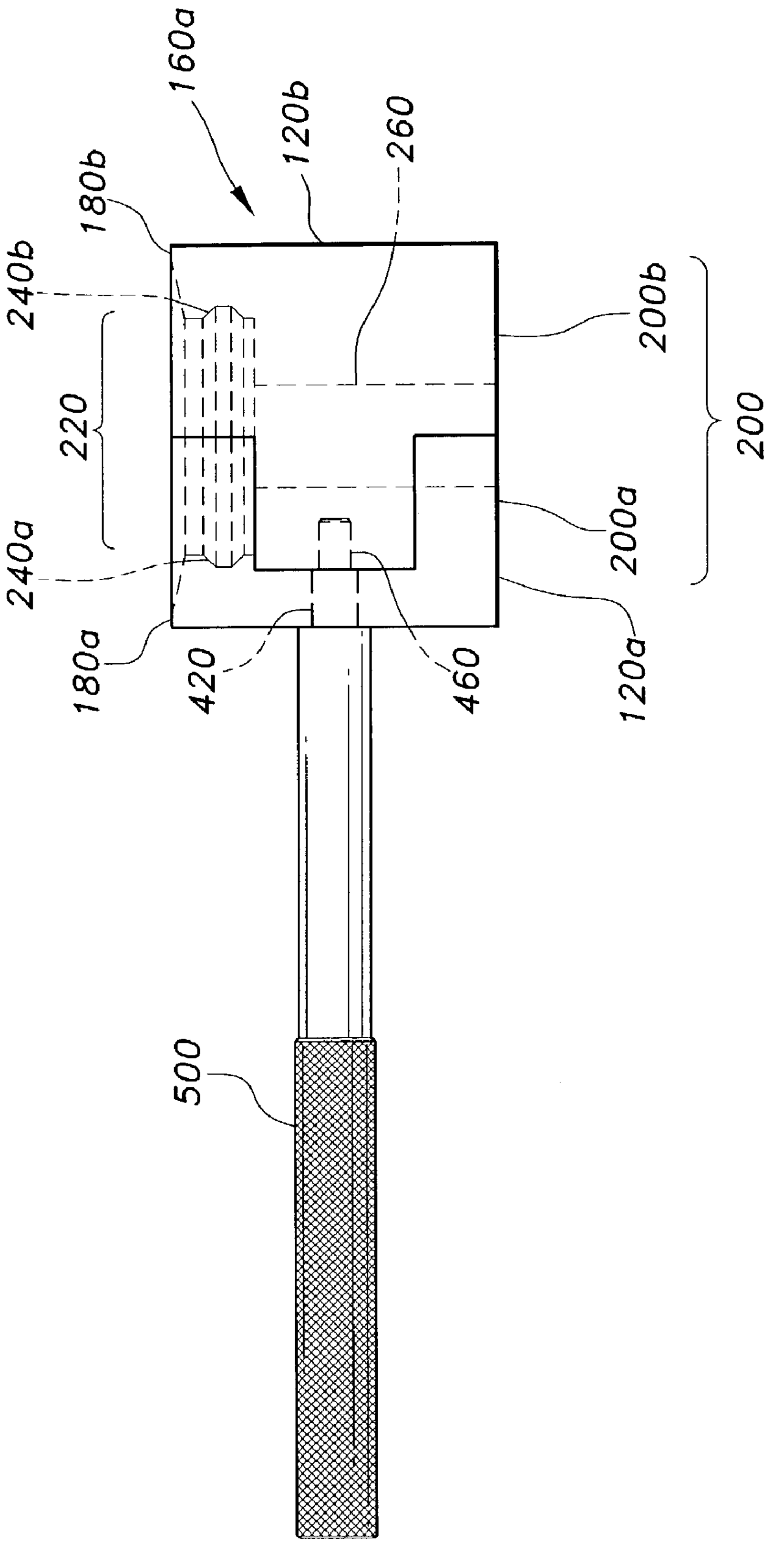
FIG. 2C is a top view of the two-part interlocking structure of FIG. 2B.
Figure 3A:
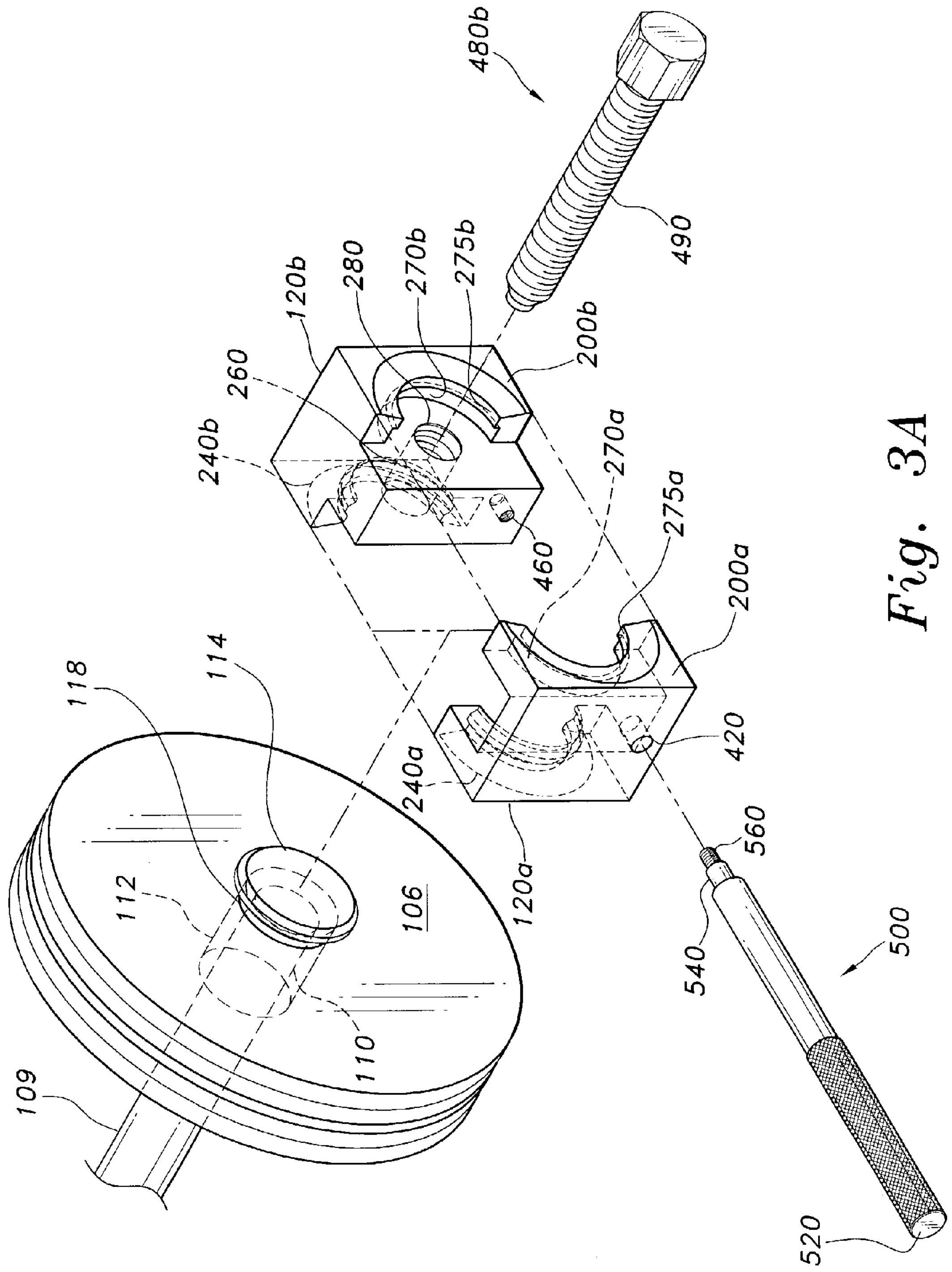
FIG. 3A is an exploded view of a tight-spot power steering pump pulley remover according to a second embodiment of the present invention.

FIGS. 2A, 2B and 2C show a first embodiment of the invention in which the tight-spot pulley puller 100 comprises a first 120*a* and second 120*b* opposite facing complementary parts. The first 120*a* and second 120*b* parts combine to form the two-part interlocking structure 160 (shown as member 160*a* in FIGS. 2A and 2B). The two-part interlocking structure 160 has a first 180 side comprising sides 180*a* and 180*b* defined respectively by parts 120*a* and 120*b*; and a second opposite side 200 comprising sides 200*a* and 200*b* defined respectively by parts 120*a* and 120*b*. The first side 180 defines a first two-part recess 220, wherein the first two-part recess 220 comprises part recesses 220*a* and 220*b* defined respectively by sides 180*a* and 180*b*.

Still referring to FIGS. 2A, 2B and 2C, the first two-part recess 220 comprises a two-part axial lip overhang 240, wherein the two-part axial lip overhang 240 comprises partial lip overhangs 240*a* and 240*b* defined respectively by sides 180*a* and 180*b*. The center of the first two-part recess 220 defines a first end of through bore 260; the bore 260 comprises a first thread 280. The two-part axial lip overhang 240 is adapted to grip the annular groove 112 (e.g., see FIG. 1D).

Thus, the first through bore 260 is a feature of part 120*b* in FIGS. 2A and 2B, and the two-part recess 220 is defined by both parts 120*a* and 120*b*. However, it should be understood that the two-part recess 220 could be located at either end of the through bore 260. In addition, it should be understood that the overall shape of the two-part interlocking structure 160 may vary; in FIGS. 2A and 2B the overall shape of the interlocking two-part structure 160*a* is rectangular, but the overall shape may vary without detracting from the spirit of the invention and include such overall shapes as oval, spherical, and spheroid.

Still referring to FIGS. 2A and 2B, the first part 120*a* defines a second through bore 420. The second part 120*b* defines has an interior face 440; the interior face 440 defines a threaded blind hole 460. The second through bore 420 and the blind hole 460 are positioned to line as shown in FIG. 2A.

The tight-spot pulley puller 100 further comprises a forcing member 480 (shown as a jackscrew 480*a* in FIG. 2A and as a threaded bolt 480*b* in FIG. 2B), and a handle 500. The forcing member 480*b* comprises a second thread 490 that complements the first thread 280. A mechanic or vehicle operator 102 can screw the forcing member 480 into the first through bore 260 until the member 480 protrudes from the first two-part recess 220 to apply a push force against the end 110 of the pump shaft 109.

The handle 500 defines two opposite ends 520 and 540. The end 540 defines a third thread 560. The end 540 is sized to fit through the bore 420 and screw into the threaded blind hole 460 thus holding the first 120*a* and second parts 120*b* to secure the two-part interlocking structure 160 (see, e.g., FIG. 2B).

FIGS. 3A, 3B, 3C, and 3D show a second embodiment of the invention in which the two-part interlocking structure 160 (shown as member 160*b*) comprises a further recess, i.e., a second two-part recess 270. The second two-part recess 270 comprises separate part recesses 270*a* and 270*b* defined respectively by sides 200*a* and 200*b*. The two-part recess 270 also comprises a two-part axial lip overhang 275, wherein the two-part axial lip overhang 275 comprises partial lip overhangs 275*a* and 275*b* defined respectively by sides 200*a* and 200*b*. The center of the two-part recess 270 defines the second opposite end of the first through bore 260. The recesses 220 and 270 can be separately adapted to fit around the hub flange 114 of different makes of pump-pulley setups thereby enabling a mechanic 102 to use the same two-part structure 160*b* to remove a pulley 105 from two different vehicle models.

Figure 3B:
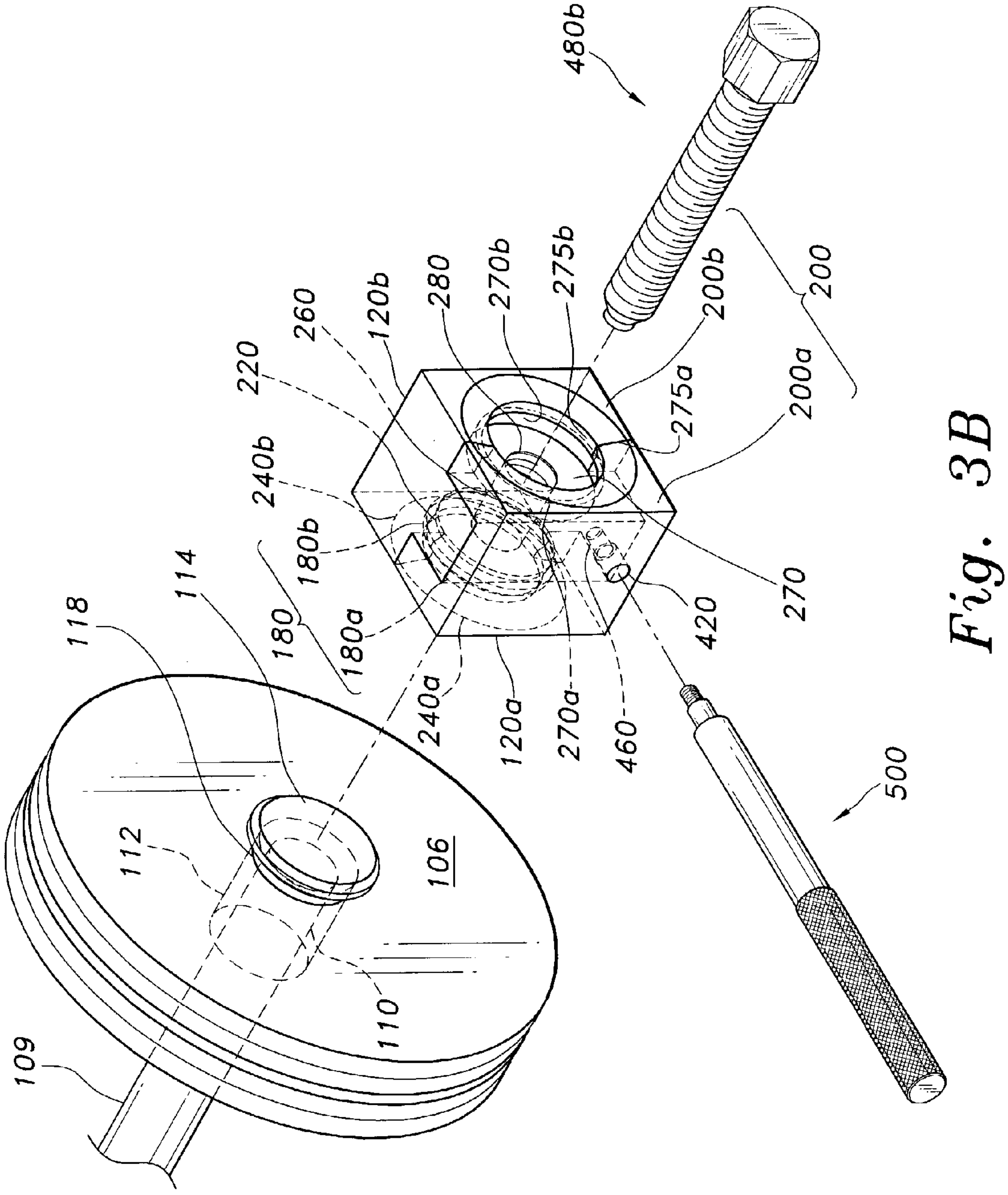
FIG. 3B is a perspective view of a two-part interlocking structure according to the second embodiment of the present invention.
Figure 3C:
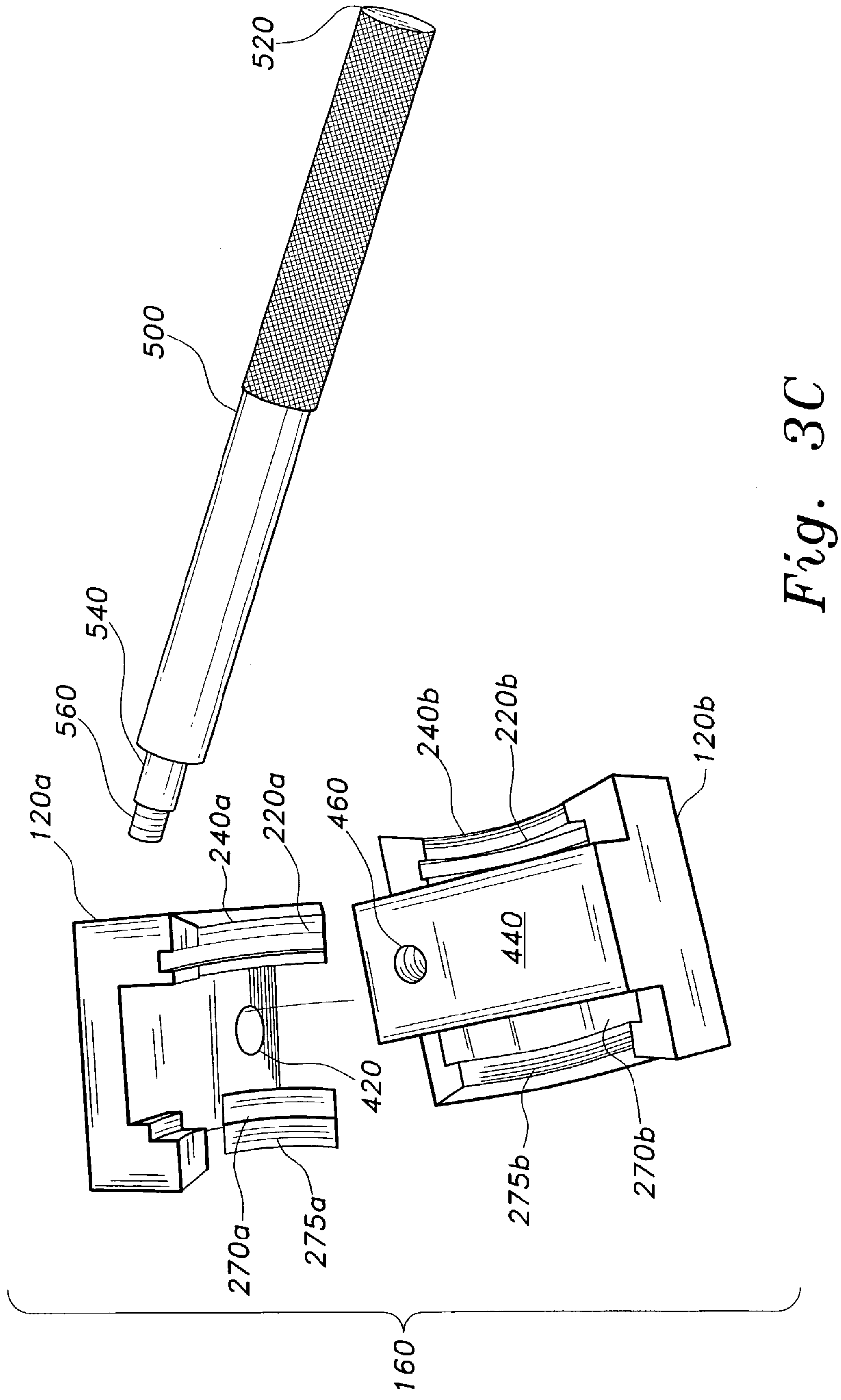
FIG. 3C is a perspective view showing the two parts of the two-part interlocking structure according to the second embodiment of the present invention.
Figure 3D:
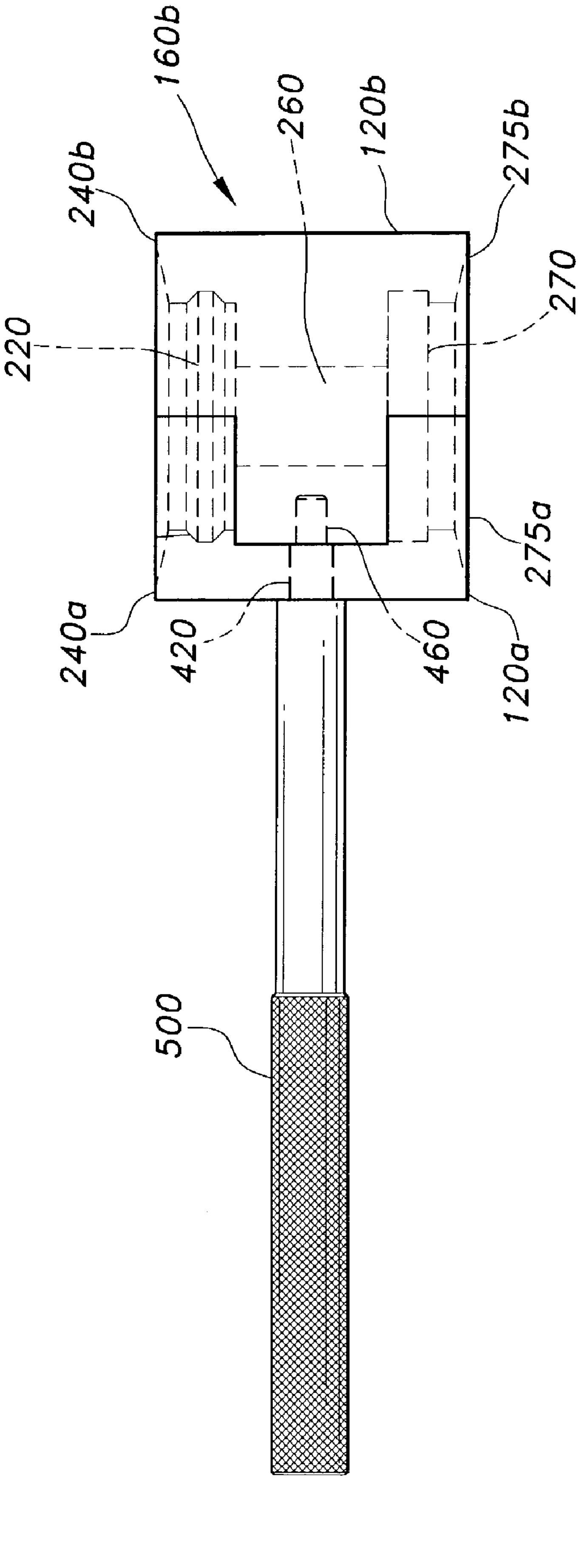
FIG. 3D is a top view of the two-part interlocking structure of FIG. 3B.

Referring to the figures in general and FIGS. 1C, 2B and 3B in particular, the overall dimensions of the two-part structure 160*a* or 160*b* are such that the pump pulley remover 100 can be maneuvered in a tight spot. The length (d1) or width (d2) of the two-part structure 160*a* or 160*b* is preferably not significantly higher than the diameter of the recess 220 and/or 270. [See FIG. 2B for guidance on use of the terms "d1", "d2" and "d3".]

In more detail, the recesses 220 and/or 270 are sized to accommodate a hub flange 114. The diameter of hub flange 114 is typically less than about 2 inches, and often less than about 1.5 inches. Given the very efficient design of the present invention the length (d1) and height (d2) of the two-part structures 160*a* or 160*b* need only be sufficient to accommodate the diameter of the recesses 220 and/or 270. The length (d1) and height (d2) of the two-part structures 160*a* or 160*b* is about 1.0 to 2.5 inches, and preferably about 1.5 to 2.0 inches. More preferably the length (d1) and height (d2) is about 1.5 inches.

With regard to the first embodiment (FIGS. 2A, 2B and 2C), the width (d3) of the two-part structure 160*a* should be sufficient to accommodate the depth of the recess 220 and the length of the through bore 260. The width (d3) of the two-part structure 160*a* can be about 0.5 to 2.0 inches, preferably about 1.0 to 1.5 inches, and more preferably about 1 inch.

With regard to the second embodiment (FIGS. 3A, 3B, 3C and 3D), the width (d3) of the two-part structure 160*b* should be sufficient to accommodate the depth of the recesses 220 and 270 plus the length of the through bore 260. The width (d3) of the two-part structure 160*b* can be about 1.0 to 2.0 inches, preferably about 1.0 to 1.5 inches, and more preferably about 1.5 inches.

It is to be understood that the present invention is not limited to the embodiments described above, but encompasses any and all embodiments within the scope of the following claims.

I claim:

1. A tight-spot pulley remover for removing a power steering pump pulley, comprising:

a two-part interlocking structure having a side defining a recess, the recess defining a through bore with a first thread, wherein the through bore travels through the two-part interlocking structure, wherein the recess further defines an axial lip overhang adapted to attach to an annular groove and the recess is adapted to accommodate a hub flange, and wherein the two-part interlocking structure defines a threaded blind hole;

a forcing member sized to fit the through bore, the forcing member has a second thread that complements the first thread thereby allowing the forcing member to pass through the through bore; and a handle reversibly attached to the blind hole of the two-part interlocking structure to provide the tight-spot pulley remover.

2. The tight-spot pulley remover according to claim 1, wherein the two-part interlocking structure comprises a first part and a second part, wherein the second part defines the through bore.

3. The tight-spot pulley remover according to claim 1, wherein the two-part interlocking structure comprises a first part and a second part, wherein the recess has a first and second segments, wherein the second part defines the through bore, and further wherein the first part defines the first segment and the second part defines the second segment of the recess.

4. The tight-spot pulley remover according to claim 1, wherein the two-part interlocking structure has a length and height in the range between about 1.0 and 2.5 inches.

5. The tight-spot pulley remover according to claim 1, wherein the two-part interlocking structure has a length and height in the range between about 1.5 to 2.0 inches.

6. The tight-spot pulley remover according to claim 1, wherein the two-part interlocking structure has a length of about 1.5 inches and a height of about 1.5 inches.

7. The tight-spot pulley remover according to claim 1, wherein the two-part interlocking structure has a width of about 0.5 to 2.0 inches.

8. The tight-spot pulley remover according to claim 1, wherein the two-part interlocking structure has a width of about 1.0 to 1.5 inches.

9. The tight-spot pulley remover according to claim 1, wherein the two-part interlocking structure has a width of about 1 inch.

10. A tight-spot pulley remover for removing a power steering pump pulley mounted on a power steering pump drive shaft with an annular groove thereon, the tight-spot pulley remover comprising:

a first and second part adapted to combine with each other and thereby collectively define a two-part structure with at least a first and second side wherein the first or second opposite side defines an external recess, wherein the external recess is a generally circular shaped depression defining an axial lip overhang, wherein the axial lip overhang comprises a first and second section wherein the first section is defined by the first part of the two-part structure and the second section is defined by the second part of the two-part structure, further wherein the external recess has a center defining a first bore that extends through the two-part structure to emerge on the opposite side of the two-part structure, wherein the first bore is at least partly lined with a first thread;

a shaft forcing member comprising a column with an exterior comprising a second thread that complements the first thread;

wherein the shaft forcing member is removably screwed into the first bore and protrude from the opposite side of the two-part structure; and a handle attached to the two-part structure, wherein the handle holds the first and second parts of the two-part structure together, wherein the handle extends laterally from the two-part structure to provide the tight-spot pulley remover, whereby either the first or second segment of the axial lip overhang is removably individually docked to the annular groove of a power steering pulley and the remaining segment of the axial lip overhang docked to the annular groove thereby gripping the annular groove to align the bolt shaft over the end of a power steering pump drive shaft such that if the shaft forcing member is screwed inwards towards the pump drive shaft and makes contact thereon the pulley is pulled off the pump drive shaft thus permitting the removal of a pulley from a power steering pump in a tight spot by the tight-spot pulley remover.

11. The tight-spot pulley remover according to claim 10, wherein the two-part interlocking structure has a width of about 1.0 to 2.0 inches.

12. The tight-spot pulley remover according to claim 10, wherein the two-part interlocking structure has a width of about 1.0 to 1.5 inches.

13. The tight-spot pulley remover according to claim 10, wherein the two-part interlocking structure has a width of about 1.5 inches.

14. The tight-spot pulley remover according to claim 10, wherein the two-part interlocking structure has a length and height in the range between about 1.0 and 2.5 inches.

15. The tight-spot pulley remover according to claim 10, wherein the two-part interlocking structure has a length and height in the range between about 1.5 to 2.0 inches.

16. The tight-spot pulley remover according to claim 10, wherein the two-part interlocking structure has a length of about 1.5 inches and a height of about 1.5 inches.

17. The tight-spot pulley remover according to claim 10, wherein the two-part interlocking structure has a width of about 0.5 to 2.0 inches.

18. The tight-spot pulley remover according to claim 10, wherein the two-part interlocking structure has a width of about 1.0 to 1.5 inches.

19. The tight-spot pulley remover according to claim 10, wherein the two-part interlocking structure has a width of about 1 inch.

20. A tight-spot pulley remover for removing a power steering pump pulley mounted on a power steering pump drive shaft with an annular groove thereon, the tight-spot pulley remover comprising:

a first and second part adapted to combine with each other and thereby collectively define a two-part structure with a first and second external recess each of generally circular shape and respectively define a first and second axial lip overhang, further wherein the first and second recess respectively has a first and second center, wherein the first and second center respectively define a first and second opposite ends of a through bore, wherein the through bore extends between the first and second centers, wherein the through bore is at least partly lined with a first thread;

a shaft forcing member comprising a bolt head and a bolt shaft wherein the bolt shaft exterior comprises a second thread that complements the first thread;

wherein the shaft forcing member is removably screwed into the first or second end of the through bore to emerge and protrude at the opposite end of the through bore; and a handle that can be screwed into the two-part structure thereby holding the first part and second part together, wherein the handle extends laterally from the two-part structure to provide the tight-spot tool to remove pulleys off power steering pump shafts, whereby combining the first and second parts enables either of the first or second axial lip overhangs to grip the annular groove of a power steering pulley while simultaneously aligning the shaft forcing screw over the end of a power steering pump drive shaft such that if the bolt is screwed inwards towards the shaft end and makes contact thereon the pulley is pulled off the shaft thus permitting the removal of a pulley from a power steering pump in a tight spot by the tight-spot power steering pump pulley removal tool.

* * * * *